United States Patent

[11] 3,612,661

| [72] | Inventors | Fritz Determann<br>Springkamp;<br>Friedrich Uberhagen, Braunschweig; Paul<br>Schuhmann, Braunschweig, all of Germany |
|---|---|---|
| [21] | Appl. No. | 800,942 |
| [22] | Filed | Feb. 20, 1969 |
| [45] | Patented | Oct. 12, 1971 |
| [73] | Assignee | A. G. Voigtlander |
| [32] | Priority | Mar. 22, 1968 |
| [33] | | Germany |
| [31] | | P 17 71 030.8 |

[54] OBJECTIVE HAVING AT LEAST FOUR COMPONENTS SITUATED IN AIR AND HAVING AN APPROXIMATELY UNCHANGED HIGH IMAGE PERFORMANCE FOR LARGE CHANGES OF THE OBJECT-DISTANCES BETWEEN INFINITY AND A MAGNIFICATION OF CLOSE TO 1:1
2 Claims, 3 Drawing Figs.

| [52] | U.S. Cl. | 350/184, 350/219, 350/220 |
|---|---|---|
| [51] | Int. Cl. | G02b 15/14 |
| [50] | Field of Search | 350/184, 219, 220 |

[56] References Cited
UNITED STATES PATENTS

| 1,877,355 | 9/1932 | Minor | 350/220 X |
| 2,179,850 | 11/1939 | Glancy | 350/184 |
| 2,587,347 | 2/1952 | Lowenthal | 350/220 |
| 3,020,804 | 2/1962 | Cox et al. | 350/220 X |
| 3,035,487 | 5/1962 | Schwartz | 350/184 |
| 3,415,592 | 12/1968 | Price | 350/184 |

*Primary Examiner*—David Schonberg
*Assistant Examiner*—Paul A. Sacher
*Attorney*—Blum, Moscovitz, Friedman and Kaplan ABSTRACT: An objective of the expanded triplet type for photographing relatively distant as well as relatively close objects. Subsequent to the first three components in the direction from the longer to the shorter conjugate there is a fourth component of relatively weak refractive power which is less than one-third the equivalent refractive power of the entire objective. The length of the air space between the third and fourth components can be varied and this air space forms a converging air lens having a length smaller than 1.5 times the paraxial equivalent focal length of the entire objective. The first and second components define between themselves a diverging air lens having refractive power greater than one-fourth but smaller than the refractive power of the converging air lens between the third and fourth components. The refractive power of this latter air lens is greater than one-fourth but less than the lens refractive power of the second component which is a biconcave diverging lens.

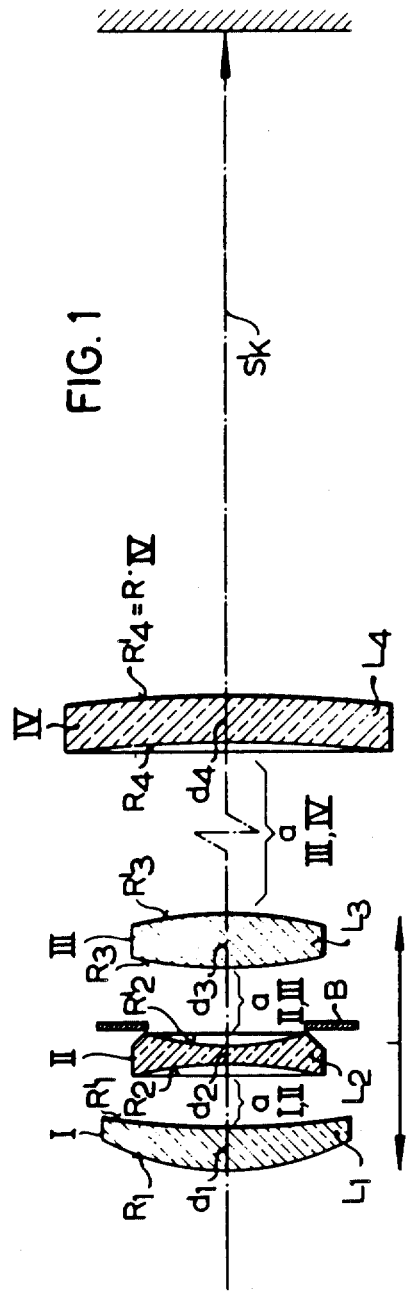
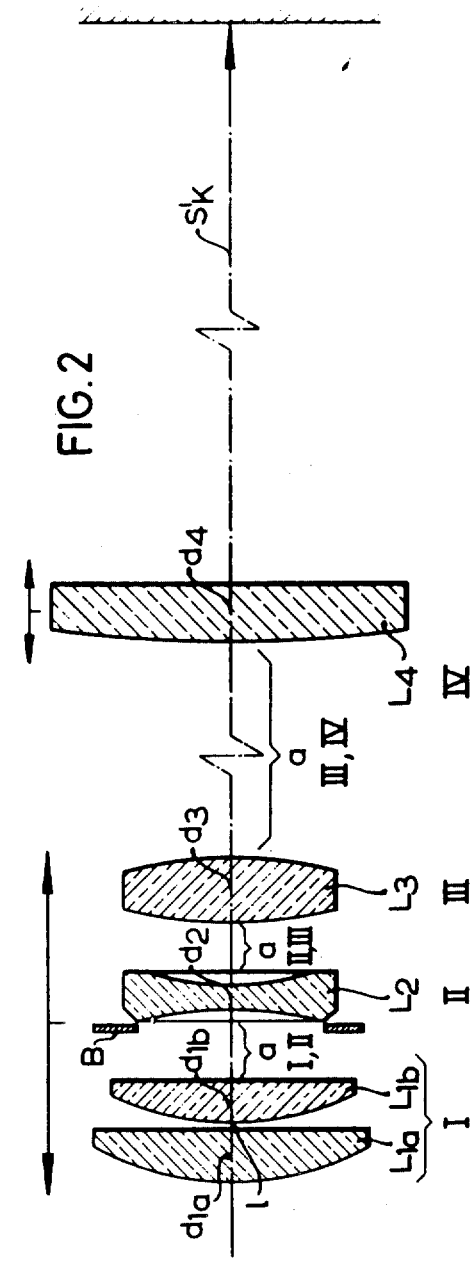

3,612,661

OBJECTIVE HAVING AT LEAST FOUR COMPONENTS SITUATED IN AIR AND HAVING AN APPROXIMATELY UNCHANGED HIGH IMAGE PERFORMANCE FOR LARGE CHANGES OF THE OBJECT-DISTANCES BETWEEN INFINITY AND A MAGNIFICATION OF CLOSE TO 1:1

BACKGROUND OF THE INVENTION

The invention relates to photographic objectives.

In particular, the invention relates to an expanded triplet type of objective having at least four individual components situated in air.

There are known objectives of the same general type as that of the present invention of differing constructions having a greater or lesser sharpness variation as a function of the scale of image magnification, with the possibility of achieving differences in image quality within a relatively narrow range where the imaging scale varies from M=0 to M=1 or less. The best embodiments achieved up to the present time for this type of objective are all triplet variations of the Heliar type where components positioned in air are used. The outer end components of this type of objective are in the form of doublets each made up of a pair of lenses, with the opposed end doublets having opposite signs respectively and being situated at a fixed distance from each other. Between these outer end components is situated the intermediate component which may be fixed or movable with respect to the end components and which is in the form of a diverging interior lens situated in air.

However, with all of these known proposals of variations of the basic Heliar type of triplet, there is still the necessity of dealing with a reduction in image sharpness when the scale of magnification changes.

SUMMARY OF THE INVENTION

It is accordingly a primary object of the present invention to provide an objective of the above general type which will avoid the above drawbacks.

Thus, it is an object of the invention to provide an objective capable of being used not only for photographing distant objects but also for photomacrography purposes.

In particular, it is an object of the invention to provide an objective which is capable of providing images of high quality without any appreciable change in the quality of the image when the imaging scale changes.

According to the invention, the objective has not only a pair of converging components respectively spaced from and situated on opposite sides of an intermediate diverging component, but in addition there is a fourth component situated behind the first three components in the direction of the shorter conjugate and having a relatively weak refractive power which while greater than 0 is smaller than one-third of the equivalent refractive power of the entire objective. The air space which is situated between the third and fourth components forms an air lens having a thickness which may be varied for the purpose of changing the scale of magnification and/or for the purpose of fine focusing. Along the optical axis this thickness of the latter air lens is greater than 0 but less than 1.5 times the paraxial equivalent focal length of the entire objective. The refractive power of this latter air lens has a sign which is opposed to the sign of the refractive power of a diverging air lens situated between the first two components. This latter diverging air lens has a refractive power whose absolute value is greater than one-fourth of the refractive power of the rear converging air lens of variable thickness but smaller than this latter refractive power. The rear air lens of variable thickness has a refractive power greater than one-fourth of the absolute value of the refractive power of the second component, which is a biconcave diverging lens situated in air between the first and third components, while the refractive power of the rear air lens of variable thickness is nevertheless smaller than the absolute value of the refractive power of the second component.

BRIEF DESCRIPTION OF DRAWINGS

The invention is illustrated by way of example in the accompanying drawings which form part of this application and in which:

FIG. 1 is a schematic representation of the simplest form of the objective of the invention, the objective of FIG. 1 having an aperture ratio of 1:4.8 and the details of the structure thereof being set forth below in table 1;

FIG. 2 shows an objective of the invention of somewhat greater "speed" where the relative aperture is 1:4.3 and where the first component of positive individual refractive power is made up of a pair of positive lenses situated closely adjacent to each other.

DESCRIPTION OF PREFERRED EMBODIMENTS

Figure 3:
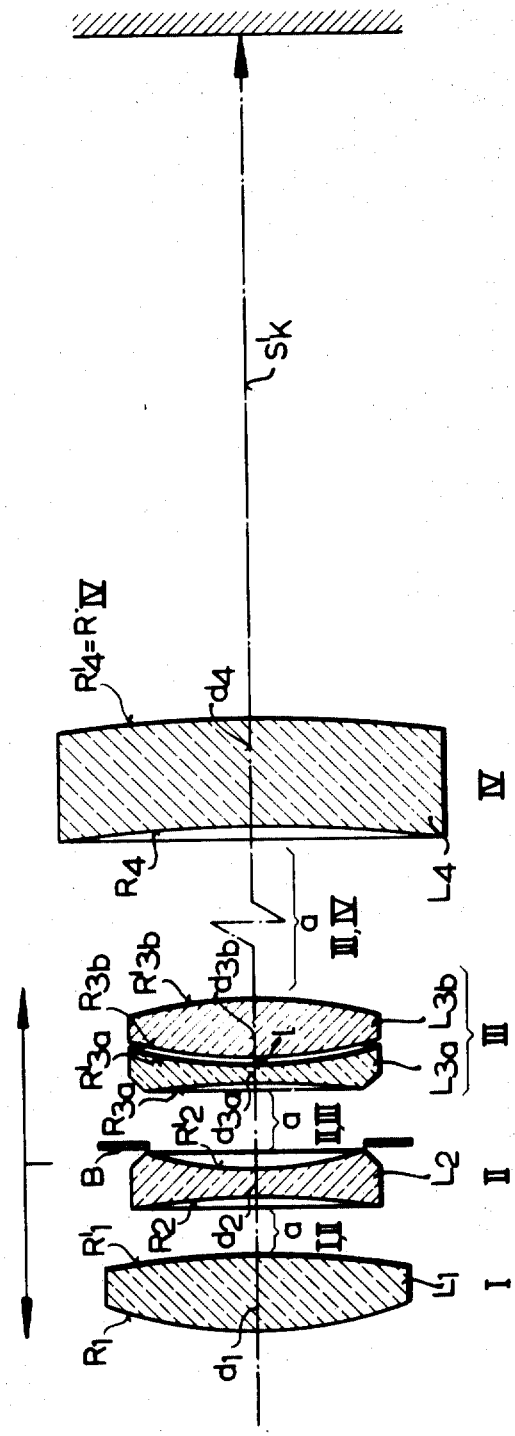
FIG. 3 is a schematic illustration of a five lens objective having a relative aperture of 1:3.9 and having the constructive details set forth in table 2 below.

The three embodiments which are respectively illustrated in FIGS. 1–3 are each composed of four components I–IV. While the components of the objective of FIG. 1 are each made up of a single lens, the first component of the objective of FIG. 2 is made up of a pair of lenses, as pointed out above, and in the embodiment of FIG. 3 the third component III is made up of a pair of lenses. This latter component III of FIG. 3 is made up of a negative and a positive lens combined together to form the component III.

In the drawings in order to illustrate the shiftability of components along the optical axis, the optical axis is illustrated as a dot-dash line which is interrupted between components III and IV in each embodiment so as to indicate that the thickness of the air lens formed between components III and IV is variable for changing the imaging scale or for fine focusing purposes. Moreover, a double-headed arrow extends in each of FIGS. 1–3 parallel to the optical axis along components I–III in order to illustrate that this group of components is shiftable along the optical axis. The location of diaphragm B is also schematically indicated in each of FIGS. 1–3. It will be noted that in each embodiment the diaphragm is situated in the region of the component II.

With the construction of the invention it has been possible to achieve an exceedingly surprising as well as highly important advance in the state of the art by providing the new objective with at least four components situated in air. On both sides of the biconcave negative component II which is situated in air in the region of the diaphragm there are, respectively, at least a pair of converging components I and III each of which may be made up of a single lens or may be a compound component made up of a plurality of lenses, as is apparent from a comparison of FIGS. 1–3. The first three components I–III are movable together with the diaphragm as a single unit along the optical axis with respect to a fourth component IV situated on that side of component III which is directed toward the shorter conjugate, this movement of the first three components and the diaphragm as a unit providing a change in the imaging scale and/or focusing of the objective. Thus, the axial air distance between components III and IV ($a_{III,IV}$) is of a variable length.

The individual components are provided with predetermined totals of surface refractive powers. Thus, component I has a positive refractive power total which is greater than $1.3\Phi$ without however, exceeding the value of $3.3\Phi$. The second component II which forms the interior biconcave negative lens has a total surface refractive power which is between $-2.0\Phi$ and $-4.0\Phi$. The third component III has a total refractive power which is greater than $0.8\Phi$ without, however, exceeding the value of $2.3\Phi$. Of course, the equivalent refractive power of the entire objective is $\Phi$. These later total refractive power values may be represented as formulas as follows:

$$1.3\Phi < \varphi_I < 3.3\Phi$$
$$-2.0\Phi < \varphi_{II} < -4.0\Phi$$
$$0.8\Phi < \varphi_{III} < 2.3\Phi$$

The fourth component IV of the invention situated behind the third converging component III in the direction of the shorter conjugate is of a relatively weak refractive power. This component IV has a total surface refractive power, the absolute value of which is greater than 0 but on the other hand remains smaller than 0.333Φ. Moreover, the variable air lens which is situated between the components III and IV has along the optical axis a thickness greater than 0 but smaller than 1.5 times the paraxial equivalent focal length $f_o$ of the entire objective for the above-mentioned scale range of M=0 to M=1. These relationships of the invention also may be set forth as formulas in the following manner;

(a)     $0 < |\varphi_{IV}| < 0.333\Phi$
(b)     $0 < (a_{III, IV}) < 1.5 f_o$
         $M = 0 \quad M = 1$ With this construction of the invention it is possible to achieve high-quality images of surprisingly great and advanced scale range even for the higher useful relative apertures of the objective of the invention, particularly with respect to lateral image errors which change with a change in the imaging scale and thus have an effect which for the most part is undesireable.

Furthermore, in order to avoid a sharp slope in the operating curve for longitudinal coma deviations and the asymmetry errors which accompany the same—which is to say, in order to maintain the coma curve—there is provided in accordance with the invention a refractive power relationship of the air lens between components I and II on the one hand and the air lens between components III and IV on the other hand, so that the total surface refractive power of the first air lens which acts as a diverging lens and which has the axial length $a_{I, II}$ is of a sign which is opposite to the sign of the total refractive power of the rear converging air lens which has the variable thickness $a_{III, IV}$. The absolute value of the total surface refractive power of this first air lens is greater than one-fourth the refractive power sum $\Phi a_{III, IV}$ of the rear converging air lens without however exceeding this latter value. This latter refractive sum $\Phi a_{III, IV}$ is greater than one-fourth of the absolute value of the lens refractive power $\Phi II$ of the biconcave diverging lens component II which is situated in air while at the same time being smaller than this latter value. Set forth as formulas, these latter relationships are as follows:

(c)     $0.25 \varphi a_{III, IV} < |\varphi a_{I, III}| < 1.0 \varphi a_{III, IV}$
(d)     $0.25 |\varphi_{II}| < \varphi a_{III, IV} < |\varphi_{II}|$.

In the course of tests and research carried out in connection with the invention, it was demonstrated that in order to avoid zonal, localized aberrations, especially of upper coma, it is or particular advantage to provide for the more sharply curved radius ($R_{IV}$) of component IV which is at the side of the shorter conjugate a value which is longer than the sum of the absolute lengths of the radii of curvature $R_2$ and $R_2'$ of the surfaces of the diverging inner component II which engage the air. On the other hand, this latter length of the radius of curvature $R_{IV}$ remains less than 8 times this latter sum. Set forth in the manner of a formula, this relationship is as follows:

(e)     $(|R_2| + |R'_2|) < |R_{IV}| < 8(|R_2| + |R'_2|)$

Upon adjustment of the objective of the invention in order to change the imaging scale and/or for fine focusing the component IV which is at the side of the shorter conjugate can be shifted either in the same direction or in the direction opposite to the front main objective unit (I, II, III). However, it is also possible to provide for component IV a fixed location with respect to the image plane so as to simplify the mechanical structure.

The specific examples of the invention which follow make use of this latter simplified construction where at the same time the more sharply curved radius $R_{IV}$ forms the last radius of the entire objective located directly next to and limiting the shorter conjugate. In the specific examples which follow, in both the drawings and the tables the radii of curvature are indicated at R, the lens thickness at d, while the air distance between the lenses are indicated at a. These latter symbols are numerically designated in series in the direction in which the light travels for making a photographic exposure. The glass constants are characterized by the refractive numbers $n_d$ taken with respect to the yellow line of the helium spectrum and the color dispersion by the Abbe number $\gamma_d$.

While in FIG. 1 the objective of the invention is composed in its entirety of four individual lenses situated in air, in the embodiment of FIG. 2 the system of great relative aperture or "speed" has the first component I in the form of a compound component made up of individual lenses $L_{1a}$ and $L_{1b}$ situated in air. Moreover, in FIG. 2 not only is the main component I–III which carries the diaphragm B shiftable along the optical axis but also the fourth component IV at the side of the shorter conjugate is shiftable along the optical axis for the purpose of changing the imaging scale and/or fine focusing as is indicated by the pair of double-headed arrows shown in FIG. 2 parallel to the optical axis over the lenses situated therealong. Thus, not only is the air distance $a_{III, IV}$ between the third and fourth components capable of being changed, but also the back focus $s_K'$ can be changed so that the double-headed arrows are situated in FIG. 2 over the unit formed of the components I–III as well as over the component IV and the optical axis is interrupted both between components III and IV and between component IV and the focal or image plane.

As was indicated above, in the embodiment of FIG. 3 the converging positive component III situated behind the inner negative component II which is in air is itself made up of a pair of lenses of opposite signs with the interior surfaces of these lenses which are directed toward each other capable of being cemented together or of remaining uncemented. Where these lenses $L_{3a}$ and $L_{3b}$ are not cemented to each other there will be an air gap there between so that the radii of curvature of the surfaces which define this air gap need not be equal to each other.

It is of course within the capabilities of a person skilled in the art to provide for an objective of the invention components II and IV either one or both of which may be made up of a pair of lenses of opposed refractive power for the purpose of achieving further fine corrections.

In the tables which follow, the equivalent focal length $f_o$ of the entire objective is 100 mm. for a distant object and for M=0. The back focus situated at the image side when considered in connection with a photographic exposure is indicated $s_K'$.

Example 1 (FIG. 1)

| $f_o$=100 mm. | Relative Aperture 1:4.8 | | $s_K'$=71.3 |
|---|---|---|---|
| $R_1$=+42.745 | | | |
| | $d_1$ = 8.177 | $n_1$=1.6935 | $\gamma_1$=51.56 |
| $R_1'$=−260.615 | | | |
| | $a_{I,II}$= 6.938 | Air | |
| $R_2$=−58.076 | | | |
| | $d_2$ = 1.588 | $n_2$=1.6461 | $\gamma_2$=34.05 |
| $R_2'$=+43.875 | | | |
| | $a_{II,III}$=8.431 | Diaphragm Chamber | |
| $R_3$=+19212.1 | | | |
| | $d_3$ =14.750 | $n_3$=1.6405 | $\gamma_3$=60.10 |
| $R_3'$=−48.388 | | | |
| | $a_{III,IV}$=7.796 | for M=0 | |
| $R_4$=−169.419 | | | |
| | $d_4$ =6.033 | $n_4$=1.5168 | $\gamma_4$=64.17 |
| $R_4'$=$R_{IV}$ =−116.875 | | | |
| During shifting V from M= to M=1, V=Δ$a_{III,IV}$=120.628 % | | | |
| $f_o$ | | | |

TABLE OF REFRACTIVE POWERS

With respect to an equivalent refractive power $\Phi=1.0$

| | |
|---|---|
| $\rho_1 = +1.62239$ | |
| $\rho_1' = +0.26610$ | $\rho_I = +1.888$ |
| $\rho_2 = -1.11252$ | $\rho a_{I,II} = -0.846$ |
| $\rho_2' = -1.47262$ | $\rho_{II} = -2.585$ |
| $\rho_3 = +0.00333$ | |
| $\rho_3' = +1.32368$ | $\rho_{III} = +1.327$ |
| $\rho_4 = -0.30504$ | $\rho a_{III,IV} = +1.019$ |
| $\rho_4' = +0.44218$ | $\rho_{IV} = +0.137$ |

For the numerical values with respect to the relationships (a)–(e) indicated above, it will be seen that:
 (a) $|\rho_{IV}| = 0.137$ lies between 0 and 0.333;
 (b) $a_{III,IV} = 7.796$ lies between 0 and 150;
 (c) $|\rho a_{I,II}| = 0.846$ lies between 0.255 and 1.019;
 (d) $\rho a_{III,IV} = 1.019$ lies between 0.646 and 2.585; and
 (e) $|R_{IV}| = 116.875$ lies between 101.95 and 815.61.

TABLE OF REFRACTIVE POWERS

With respect to the equivalent refractive power $\Phi=1.0$

| | |
|---|---|
| $\rho_1 = +1.87565$ | |
| $\rho_1' = +0.41990$ | $\rho_I = +2.296$ |
| $\rho_2 = -1.080828$ | $\rho a_{I,II} = -0.660$ |
| $\rho_2' = -1.94882$ | $\rho_{II} = -3.029$ |
| $\rho_{3a} = -0.42659$ | |
| $\rho_{3a}' = -1.21170$ | $\rho_{3a} = -1.638281$ |
| $\rho_{3b} = +1.48276$ | $\rho_{III} = +1.254$ |
| $\rho_{3b}' = +1.40965$ | $\rho_{3b} = 2.892409$ |
| $\rho_4 = -0.01190$ | $\rho a_{III,IV} = +1.398$ |
| $\rho_4' = +0.13057$ | $\rho_{IV} = +0.119$ |

For the above numerical values the relationships (a)–(e) are as follows:
 (a) $|\rho_{IV}| = 0.119$ lies between 0 and 0.333;
 (b) $a_{III,IV} = 12.1$ lies between 0 and 150;
 (c) $|\rho a_{I,II}| = 0.660$ lies between 0.349 and 1.398;
 (d) $\rho a_{III,IV} = 1.398$ lies between 0.757 and 3.029; and
 (e) $|R_{IV}| = 390.652$ lies between 89.55 and 716.38.

Example 2 (FIG. 3)

$f_e = 100$ mm.   Relative Aperture 1:3.9   $s_g' = 68.625$

| | | | |
|---|---|---|---|
| $R_1 = +38.2267$ | | | |
| | $d_1 = 6.467$ | $n_d = 1.71700$ | $\gamma_1 = 48.0$ |
| $R_1' = -170.753$ | | | |
| | $a_{I,II} = 4.558$ | Air | |
| $R_2 = -57.6119$ | | | |
| | $d_2 = 3.346$ | $n_d = 1.62237$ | $\gamma_2 = 36.0$ |
| $R_2' = +31.9357$ | | | |
| | $a_{II,III} = 5.436$ | Diaphragm Chamber | |
| $R_{3a} = -122.697$ | | | |
| | $d_{3a} = 11.640$ | $n_d = 1.52341$ | $\gamma_{3a} = 51.5$ |
| $R_{3a}' = +43.1965$ | | | |
| | $l = 0$ | cemented | |
| $R_{3b} = +43.1965$ | | | |
| | $d_{3b} = 8.083$ | $n_d = 1.64050$ | $\gamma_{3b} = 60.1$ |
| $R_{3b}' = -45.4368$ | | | |
| | $a_{III,IV} = 12.124$ | for $M=0$ | |
| $R_4 = -4253.27$ | | | |
| | $d_4 = 10.734$ | $n_d = 1.51009$ | $\gamma_4 = 63.5$ |
| $R_4' = R_{IV}' = -390.652$ | | | |

Upon shifting V from $M=0$ to $M=1$
$V = \Delta a_{III,IV} = 118.303 \% f_e$.

We claim:
1. In an objective of the expanded triple type for use in photography and reproduction and for photographing relatively distant as well as relatively close objects with an approximately constant correction of the normally broadly changing amounts of aberrations, which are otherwise changed with the ratio of the focal length to the object-distance, an objective having a diaphragm associated therewith, a biconcave diverging lens situated in air close to the position of the location of the diaphragm of the objective, a plurality of components including a pair of converging components respectively situated on opposite sides of said diverging lens, and wherein the objective has the following data:

| | | | |
|---|---|---|---|
| $R_1 = 42.745$ | | | |
| | $d_1 = 8.177$ | $n_d = 1.6935$ | $\gamma_1 = 51.56$ |
| $R_1' = -260.615$ | | | |
| | $a_{I,II} = 6.938$ | Air | |
| $R_2 = -58.076$ | | | |
| | $d_2 = 1.588$ | $n_d = 1.6461$ | $\gamma_2 = 34.05$ |
| $R_2' = +43.875$ | | | |
| | $a_{II,III} = 8.431$ | Diaphragm Chamber | |
| $R_3 = +19212.1$ | | | |
| | $d_3 = 14.750$ | $n_d = 1.6405$ | $\gamma_3 = 60.10$ |
| $R_3' = -48.388$ | | | |
| | $a_{III,IV} = 7.796$ | for $M=0$ | |
| $R_4 = -169.419$ | | | |
| | $d_4 = 6.033$ | $n_d = 1.5168$ | $\gamma_4 = 64.17$ |
| $R_4' = -116.875$ | | | |

Shifting V from $M=0$ to $M=1$
being: $V = \Delta a_{III,IV} = 118.303 \% f_e$.

wherein $R_n$ is the radius of curvature, $d_n$ is the thickness of the respective lens, $a_n$ is the air space between lenses, $n_d$ is the index of refraction of the yellow line of helium and $\gamma$ is the Abbe number.

2. In an objective of the expanded triple type for use in photography and reproduction and for photographing relatively distant as well as relatively close objects with an approximately constant correction of the normally broadly changing amounts of aberrations, which are otherwise changed with the ratio of the focal length to the object-distance, an objective having a diaphragm associated therewith, a biconcave diverging lens situated in air close to the position of the location of the diaphragm of the objective, a plurality of components including a pair of converging components respectively situated on opposite sides of said diverging lens, and wherein the objective has the following data:

| | | | |
|---|---|---|---|
| $R_1 = 38.23$ | | | |
| | $d_1 = 6.47$ | $n_d = 1.717$ | $\gamma_1 = 48.0$ |
| $R_1' = -170.75$ | | | |
| | $a_{I,II} = 4.558$ | Air | |
| $R_2 = -57.61$ | | | |
| | $d_2 = 3.35$ | $n_d = 1.622$ | $\gamma_2 = 36.0$ |
| $R_2' = +31.94$ | | | |
| | $a_{II,III} = 5.436$ | Diaphragm Chamber | |
| $R_{3a} = -122.70$ | | | |
| | $d_{3a} = 11.64$ | $n_d = 1.523$ | $\gamma_{3a} = 51.5$ |
| $R_{3a}' = +43.20$ | | | |
| | $l = 0$ | Cemented | |
| $R_{3b} = +43.20$ | | | |
| | $d_{3b} = 8.08$ | $n_d = 1.641$ | $\gamma_{3b} = 60.1$ |
| $R_{3b}' = -45.44$ | | | |
| | $a_{III,IV} = 12.124$ | for $M=0$ | |
| $R_4 = -4253.27$ | | | |
| | $d_4 = 10.734$ | $n_d = 1.510$ | $\gamma_4 = 63.5$ |
| $R_4' = -390.65$ | | | |

Shifting V from $M=0$ to $M=1$
being: $V = \Delta a_{III,IV} = 118.303 \% f_e$.

wherein the cemented radii $R_{3a}'$ and $R_{3b}$ between which the enclosed airgap $l=0$ is enclosed form a common cemented surface because of the configuration of the adjoining pair of surfaces having the latter radii.

wherein $R_n$ is the radius of curvature, $d_n$ is the thickness of the respective lens, $a_n$ is the air space between lenses, $n_d$ is the index of refraction of the yellow line of helium and $\gamma$ is the Abbe number.